(12) United States Patent
White

(10) Patent No.: US 6,368,047 B1
(45) Date of Patent: Apr. 9, 2002

(54) LOG TRAILER

(76) Inventor: Noal White, 5259 W. Taft Rd., North Syracuse, NY (US) 13212

( * ) Notice: Subject to any disclaimer, the term of this patent is extended or adjusted under 35 U.S.C. 154(b) by 0 days.

(21) Appl. No.: 09/714,227

(22) Filed: Nov. 17, 2000

Related U.S. Application Data

(60) Provisional application No. 60/167,669, filed on Nov. 29, 1999.

(51) Int. Cl.$^7$ .............................. B60P 1/48; B60P 7/06
(52) U.S. Cl. ........................ 414/555; 296/182; 296/3; 414/539
(58) Field of Search ............................... 296/181, 182, 296/3, 4, 5, 6; 414/555, 538, 539

(56) References Cited

U.S. PATENT DOCUMENTS

| 3,087,744 A | | 4/1963 | Tanenbaum |
| 4,200,305 A | | 4/1980 | Eubank |
| 4,200,315 A | | 4/1980 | Carlsson |
| 4,540,328 A | | 9/1985 | McManama |
| 4,674,942 A | | 6/1987 | Assh et al. |
| 4,966,383 A | | 10/1990 | Sjostrom |
| 4,984,961 A | | 1/1991 | Herolf |
| 5,127,663 A | | 7/1992 | Whitehead |
| 5,769,586 A | * | 6/1998 | Schulte |
| 6,209,942 B1 | * | 4/2001 | French |
| 6,220,811 B1 | * | 4/2001 | Bernecker |

FOREIGN PATENT DOCUMENTS

| DE | 1012188 | 3/1956 |
| IT | 325245 | 3/1935 |

* cited by examiner

*Primary Examiner*—Joseph D. Pape
(74) *Attorney, Agent, or Firm*—Richard C. Litman

(57) ABSTRACT

A light-weight log trailer with a centrally disposed grapple loader mounting area. The trailer can be hitched to a truck and moved along rough terrain as well as on roads and highways. The log trailer includes a substantially rectangular chassis having a truncated A-shaped forward section, a rectangular rear section, and a perimeter rail and floor beams made from steel C-channels that support the weight of a load of logs. The forward section has two parallel I-beams that contain a grapple-loader platform. The grapple loader can pick up logs and place them inside a three-sided log corral mounted on the rear section of the trailer. The log corral includes a steel post and wire screen barrier wall to protect the grapple loader from any logs.

12 Claims, 5 Drawing Sheets

LOG TRAILER

CROSS-REFERENCE TO RELATED APPLICATION

This application claims the benefit of U.S. Provisional Patent Application Ser. No. 60/167,669, filed Nov. 29, 1999.

BACKGROUND OF THE INVENTION

1. Field of the Invention

The present invention relates to trailers, and more specifically, to a log trailer with mounted grapple loader.

2. Description of the Invention

There has persisted a need for a road worthy, but inexpensive way to load and to haul logs for small operations such as tree services, landscapers, farmers, small wood lot owners, municipal workers (after a storm) and the like. Operations such as these involving relatively small amounts of wood, but a significant amount for those not equipped for the task, encounter great difficulty in handling logs. In many instances, logs can be a nuisance for small operations because they kill grass and they create obstruction to pedestrian and vehicular traffic. A new, full-size log truck will cost approximately $80,000.00, so they are cost prohibitive for most of the small operations who must deal with the problem. The related art discussed below is representative of developments prior to my invention.

U.S. Pat. No. 4,200,315 issued to K. Carlsson on Apr. 29, 1980 describes a drawbar construction for a semitrailer. Carlsson does not teach the present invention as claimed.

U.S. Pat. No. 4,540,328 issued to C. E. McManama on Sep. 10, 1985 describes a logging trailer. McManama does not teach the present invention as claimed.

U.S. Pat. No. 4,674,942 issued to Assh, et al. on Jun. 23, 1987 describes a wheel-mounted self-propelled trailer with lifting mechanism. Assh, et al. do not teach the present invention as claimed.

U.S. Pat. No. 4,966,383 issued to H. Sjostrom on Oct. 30, 1990 describes an extended trailer. Sjostrom does not teach the present invention as claimed.

U.S. Pat. No. 4,984,961 issued to O. Herolf on Jan. 15, 1991 describes a road vehicle for handling and transporting logs. Herolf does not teach the present invention as claimed.

U.S. Pat. No. 5,127,663 issued to J. M. Whitehead on Jul. 7, 1992 describes a truck-trailer combination for carrying loads on highways.

None of the above inventions and patents, taken either singly or in combination, is seen to describe the instant invention as claimed.

SUMMARY OF THE INVENTION

The present invention is a light-weight log trailer with a centrally disposed grapple loader mounting area. The trailer can be hitched to a truck and moved along rough terrain as well as on roads and highways. The log trailer includes a substantially rectangular chassis having a truncated A-shaped forward section, a rectangular rear section, and perimeter rails and floor beams made from steel C-channels that support the weight of a load of logs. The forward section comprises a V-shaped hitch section and a rectangular mounting frame made from two parallel I-beams, formed by welding two C-channels back to back, extending from the left perimeter rail to the right perimeter rail. The mounting frame contains a grapple-loader platform that supports a grapple loader. The grapple loader can pick up logs and place them inside the log trailer, on the floor beams. To contain the logs, a three-sided log corral is mounted on the rear section of the trailer. The log corral comprises a plurality of vertical, steel square tube guide posts extending from a top surface of the perimeter rails, and from a top surface of the I-beam. The posts along the I-beam support a steel mesh screen to form a grapple loader barrier wall to protect the grapple loader from any logs.

Accordingly, it is a principal object of the log trailer invention to provide a small, light-weight machine to remove and to haul logs.

It is another object of the invention to provide a way of removing/hauling logs that does not involve dragging the logs on landscaped terrain or lawn areas.

It is a further object of the invention to provide a conveniently sized vehicle that can enter restrictive areas and load and haul significant amounts of logs on rough terrain, roads and highways.

It is an object of the invention to provide improved elements and arrangements thereof in an apparatus for the purposes described which is inexpensive, dependable and fully effective in accomplishing its intended purposes. These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

As shown in FIGS. 1 through 5, the present invention is a log trailer 10 with a grapple loader 12 mounting area. Trailer 10 has dimensions of approximately 7½ feet wide by twenty feet long. Trailer 10 and grapple loader 12, together, weigh about 4000 lbs, which give it the capability of handling a 7-ton payload. Trailer 10 can be hitched to a truck 14 and moved along rough terrain as well as on roads and highways.

Figure 1:
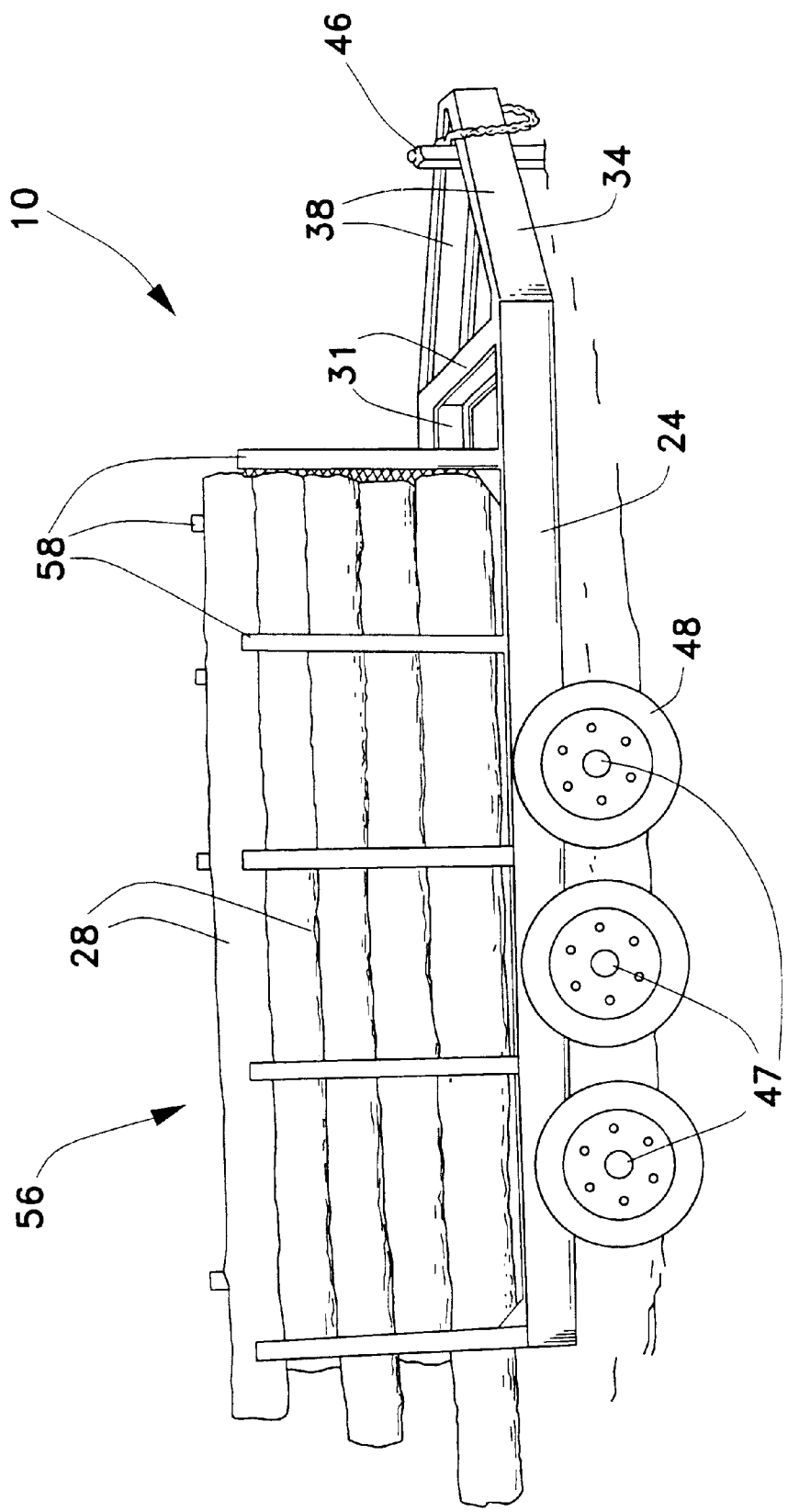
FIG. 1 is an environmental, perspective view of a log trailer, showing phantom logs, according to the present invention.
Figure 2:
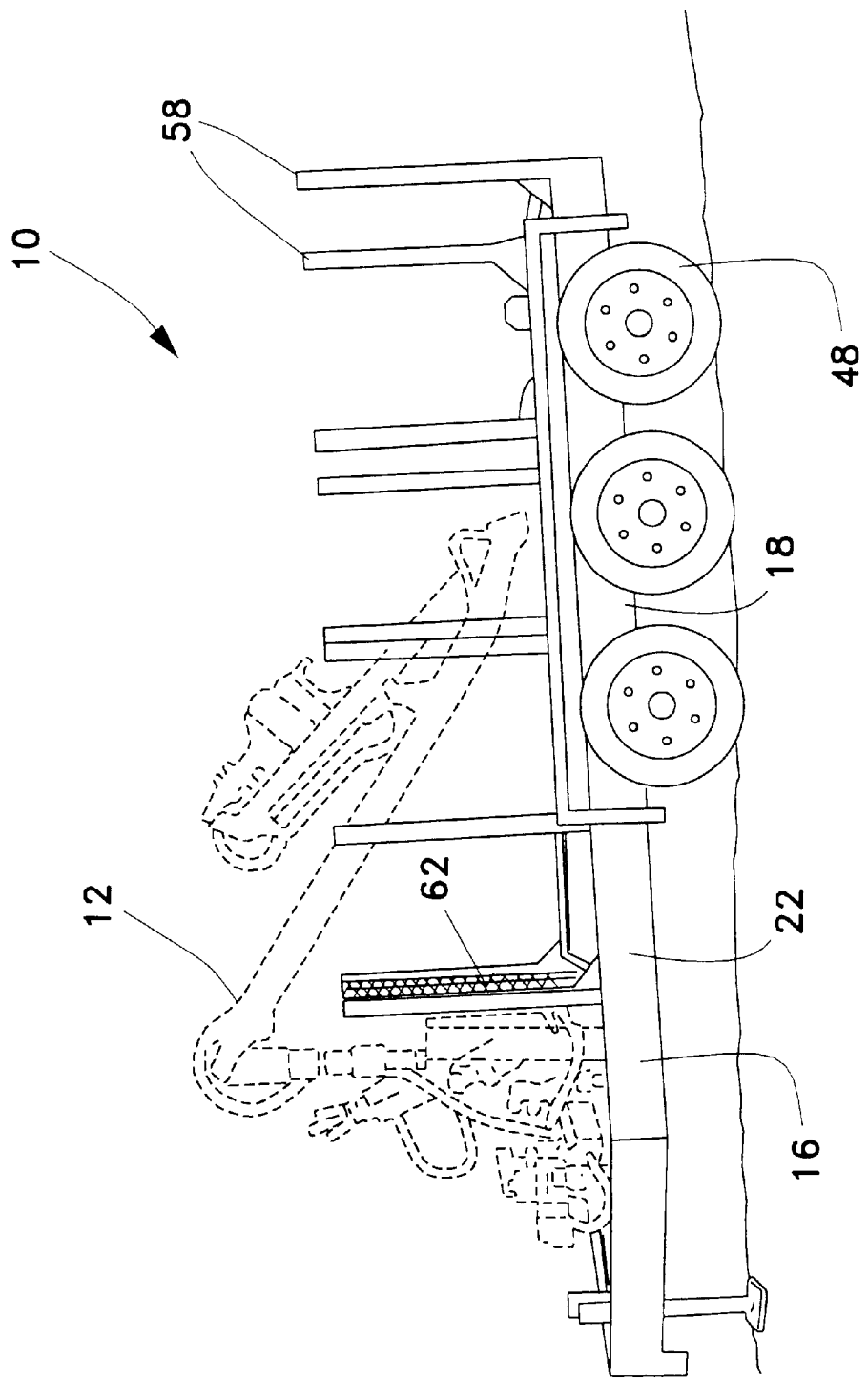
FIG. 2 is a side perspective view of the log trailer showing the grapple loader in phantom lines.
Figure 3:
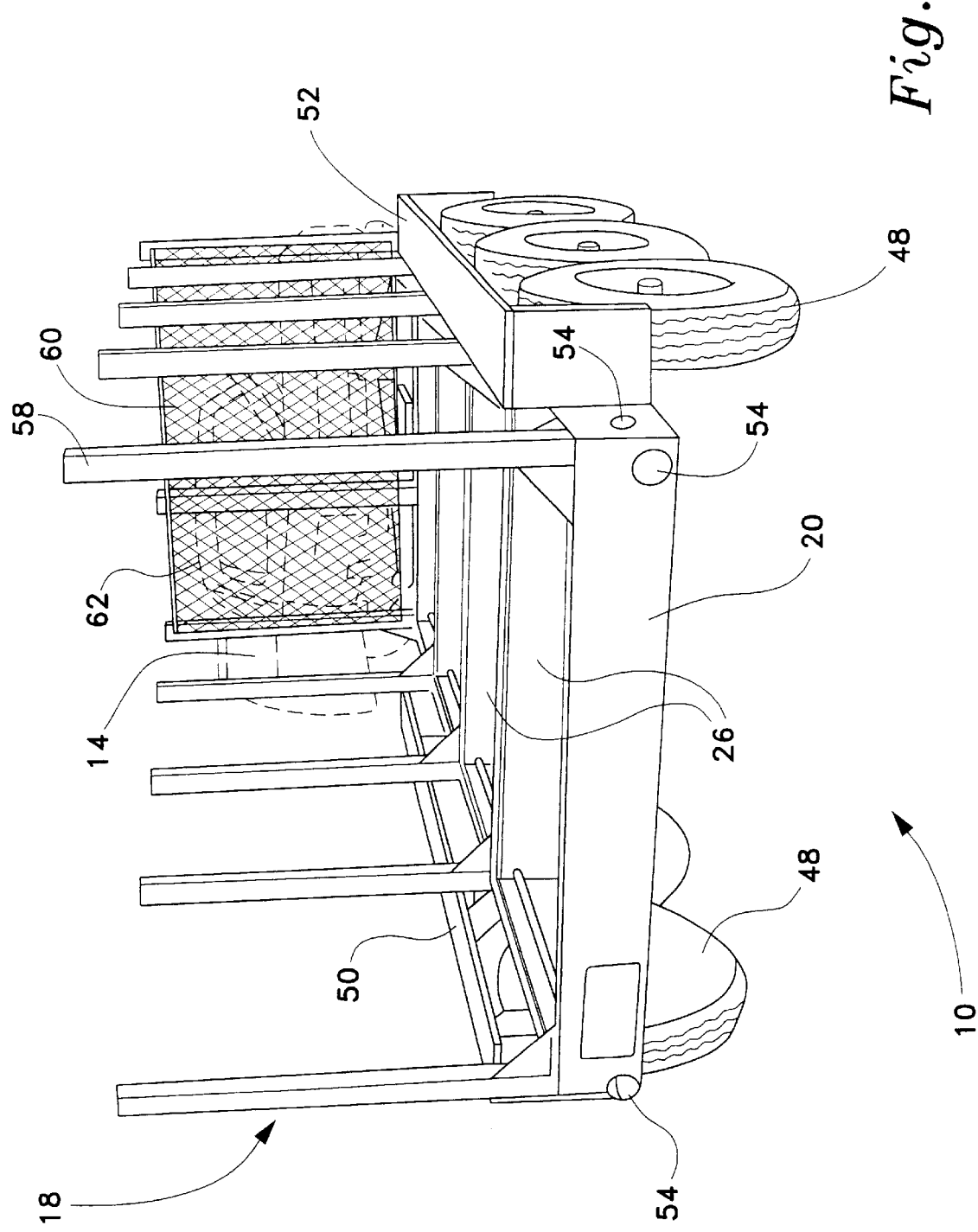
FIG. 3 is a rear perspective view of the log trailer showing the truck in phantom lines.
Figure 4:
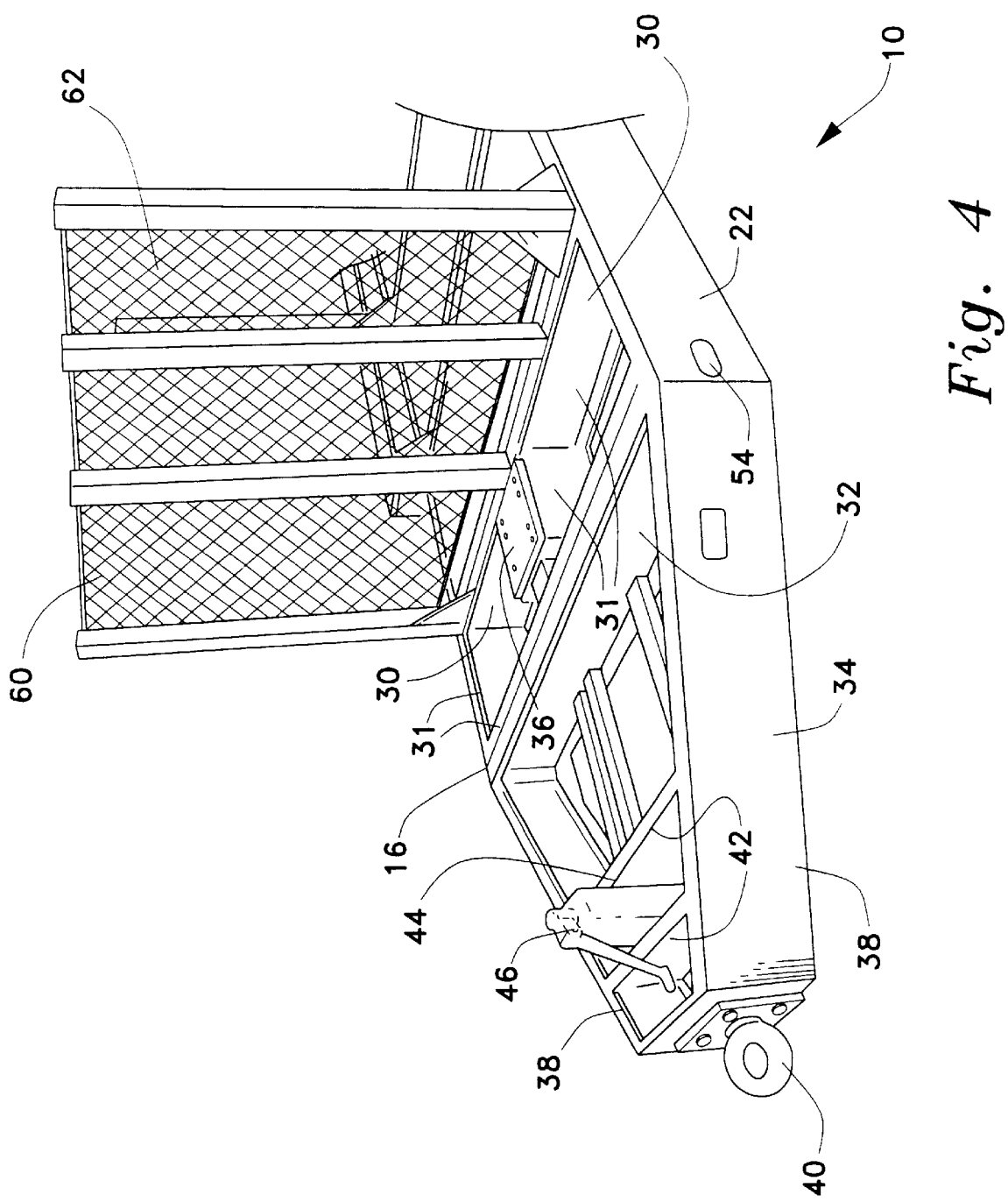
FIG. 4 is a front perspective view of the log trailer showing the hitch, the built-in grapple loader platform, and the log barrier to protect the grapple loader.
Figure 5:
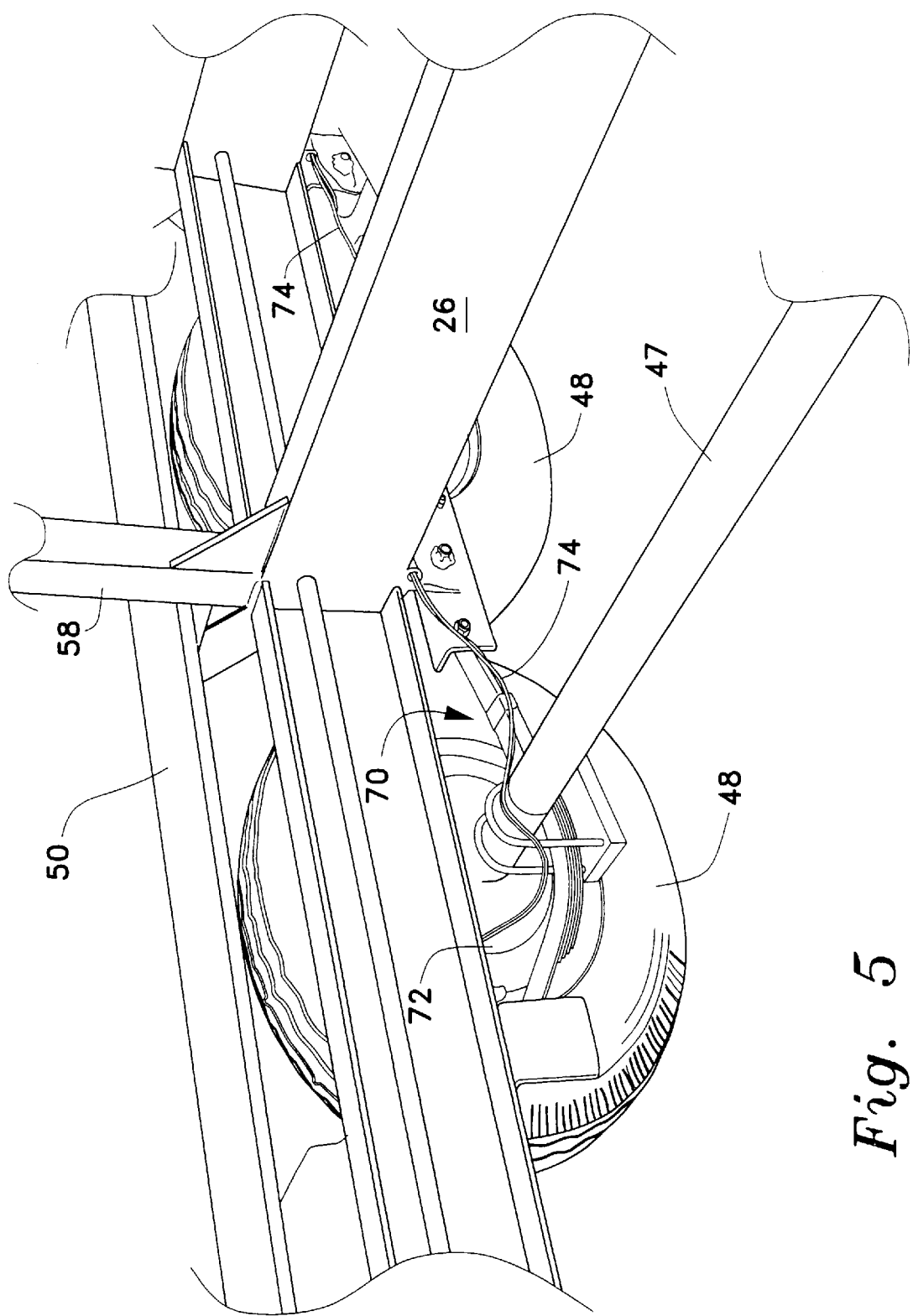
FIG. 5 is a interior perspective view of th log trail axle and wheel assembly showing the electric breaks and slipper spring.

Trailer 10 includes a chassis having a truncated-A-shaped forward section 16 best shown in FIG. 4, joined to a substantially rectangular rear section 18 best shown in FIG. 3. The perimeter of rear section 18 is defined by a steel, C-channel rear rail 20, a steel, C-channel left rail 22, and a steel, C-channel right rail 24. Preferably, the frame is 10 inch, 15.3 lb channel steel, although other sizes could be used. A series of parallel C-channel floor beams 26 extend, in parallel succession, from rear rail 20 to forward section 16 in order to support the weight of logs 28. Each of floor beams 26 connects left rail 22 to right rail 24.

Forward section 16 further comprises a rectangular mounting frame 31 made from a first I-beam 30 adjacent to rear section 18, and a second I-beam 32 adjacent to hitch section 34. Each I-beam 30, 32 connects left rail 22 to right rail 24. I-beams 30 and 32 are preferably made from two C-channels welded back to back, preferably 10 inch C-channels but, in any case, should be the same or similar height as floor beams 26. Frame 31 contains a grapple-loader platform 36 supporting grapple loader 12. Platform 36 is disposed mid-way between left rail 22 and right rail 24, and is connected to each of I-beam 30 and I-beam 32 at their respective longitudinal mid-points. The mounting bracket for platform 36 can be designed to fit any grapple loader. However, there must be an area of at least two square feet within frame 31 in order to mount loader 12.

Hitch section 34, approximately 5 feet long, is shaped like a truncated V, and comprises two C-shaped outer rails 38 converging from second I-beam 32 towards a trailer hitch 40. A plurality of steel ribs 42 connect, and are substantially transverse to, outer rails 38. A plurality of steel braces connect second I-beam 32 to a first rib 44 of ribs 42. There is also a hand crank 46 between two adjacent ribs 42, to adjust the positioning of hitch 40.

Trailer 10 maintains a plurality of axles 47, and a wheel 48 at the opposite end of each of axles 47 to support the chassis and trailer 10. Preferably, there are three 6000 lb axles resulting in a gross weight of 18,000 lbs. A seen particularly in FIG. 5, The axles have a spring center or slipper spring 70. The spring center could range from about 60 inches to approximately 100 inches. However, with a spring center approaching 102 inches, it becomes difficult to maneuver trailer 10 into small areas. Less than a 60 inch spring center is ineffective for hauling logs. Preferably, trailer 10 has a 74 inch spring center. At least two axles have electric brakes, generally 72, connected to a power source by wires 74. For better stopping ability when trailer 10 is full, preferably all three axles have electric brakes.

To contain logs 28, a three-sided log corral 56 is mounted on rear section 18. Corral 56 comprises a plurality of vertical, steel square tube uprights, or guide posts 58 extending from a top surface of left rail 22, and from a top surface of right rail 24, and from a top surface of first I-beam 30. The plurality of guide posts 58 along first I-beam 30 supports a steel mesh screen 60 extending from said left rail to said right rail and having the same height of guide posts 58 so as to form a grapple loader barrier wall 62. Barrier wall 62, best shown in FIGS. 3 and 4, protects grapple loader 12 from any logs 28 contained within log corral 56. Guide posts 58 are preferably made from 3 inch by 3 inch by 3 inch by 16 inch tube steel welded to rails 20 and 22, and to beam 30. A ½ inch steel plate gusset is used where guide posts 58 meet the rails, for added strength. The corral, or cargo area, is preferably 6 feet wide by 12 feet long by 4 feet high.

A left fender 50 is mounted to and along left rail 22 and a right fender 52 is mounted to and along right rail 24 to cover each wheel 48. For road safety, at least two reflectors 54 are disposed on hitch section 34, and on each of rails 20, 22, and 24.

It is to be understood that the present invention is not limited to the embodiments described above, but encompasses any and all embodiments within the scope of the following claims.

I claim:

1. A log trailer with grapple loader mount, comprising:
    a chassis comprising:
        a truncated-A-shaped forward section;
        a substantially rectangular rear section adjoining said forward section, said rear section defined by a steel rear rail, a steel left rail, a steel right rail;
        a series of floor beams in parallel succession from said rear rail to said forward section, each of said floor beams connecting said left rail to said right rail, said forward section further comprising:
            a rectangular mounting frame made from a first I-beam adjacent to said rear section and a second I-beam adjacent to said hitch section, each said I-beam connecting said left rail to said right rail, said frame containing a grapple-loader platform supporting a grapple loader, said platform disposed mid-way between said left rail and said right rail and connecting each said I-beam at its longitudinal mid-point; and
        a plurality of axles, each said plurality of axles including at least one wheel, supporting said chassis.

2. The device according to claim 1, wherein said device further comprises a truncated V-shaped hitch section comprising two outer rails converging from said second I-beam towards a trailer hitch, a plurality of steel ribs connecting said outer rails, a plurality of braces connecting said second I-beam to a first of said ribs, and a hand crank between two adjacent said ribs.

3. The device according to claim 1, wherein said device further comprises a left fender mounted to and along said left rail and a right fender mounted to and along said right rail to cover each said at least one wheel.

4. The device according to claim 1, wherein said device further comprises at least two reflectors on said hitch section, and at least two said reflectors on each said rail.

5. The device according to claim 1, wherein said device further comprises a three-sided log corral mounted on said rear section, said corral comprising a plurality of vertical, steel square tube guide posts extending from a top surface of said left rail, and from a top surface of said right rail, and from a top surface of said first I-beam, said plurality along said first I-beam supporting a steel mesh screen extending from said left rail to said right rail and having the height of said guide posts so as to form a grapple loader barrier wall, wherein said barrier wall protects said grapple loader from any logs contained within said log corral.

6. The device according to claim 1, wherein each of said axles has a spring center between sixty and one hundred inches.

7. The device according to claim 1, wherein each of said axles has electric brakes.

8. The device according to claim 1, wherein each of said axles has a spring center of about seventy-four inches.

9. A log trailer with grapple loader mount, comprising:
    a chassis comprising:
        a truncated-A-shaped forward section;
        a substantially rectangular rear section adjoining said forward section, said rear section defined by a steel rear rail, a steel left rail, a steel right rail;
        a series of floor beams in parallel succession from said rear rail to said forward section, each of said floor beams connecting said left rail to said right rail, said forward section further comprising:
            a rectangular mounting frame made from a first I-beam adjacent to said rear section and a second I-beam adjacent to said hitch section, each said I-beam connecting said left rail to said right rail, said frame containing a grapple-loader platform supporting a grapple loader, said platform disposed mid-way between said left rail and said right rail and connecting each said I-beam at its longitudinal mid-point;
        a truncated V-shaped hitch section comprising two outer rails converging from said second I-beam towards a trailer hitch, a plurality of steel ribs connecting said outer rails, a plurality of braces connecting said second I-beam to a first of said ribs, a hand crank between two adjacent said ribs;

a plurality of axles, and a wheel at each opposite end of each of said axles, supporting said chassis;

a left fender mounted to and along said left rail and a right fender mounted to and along said right rail to cover each said wheel;

at least two reflectors on said hitch section, and at least two said reflectors on each said rail; and a three-sided log corral mounted on said rear section, said corral comprising a plurality of vertical, steel square tube guide posts extending from a top surface of said left rail, and from a top surface of said right rail, and from a top surface of said first I-beam, said plurality along said first I-beam supporting a steel mesh screen extending from said left rail to said right rail and having the height of said guide posts so as to form a grapple loader barrier wall, wherein said barrier wall protects said grapple loader from any logs contained within said log corral.

10. The device according to claim 9, wherein each of said axles has a spring center between sixty and one hundred inches.

11. The device according to claim 9, wherein each of said axles has electric brakes.

12. The device according to claim 9, wherein each of said axles has a spring center of about seventy-four inches.

\* \* \* \* \*